United States Patent [19]

Geiger

[11] Patent Number: 4,976,386

[45] Date of Patent: Dec. 11, 1990

[54] BICYCLE CARRIER

[76] Inventor: John Geiger, P.O. Box 593, Blue Jay, Calif. 92317

[21] Appl. No.: 367,880

[22] Filed: Jun. 19, 1989

[51] Int. Cl.$^5$ ................................................ B60R 9/00
[52] U.S. Cl. ........................ 224/42.45 R; 224/42.03 B; 248/903
[58] Field of Search ................. 224/42.0 BB, 42.45 R, 224/42.12, 42.21, 42.28, 42.3, 42.44; 248/220.1, 231.1, 903

[56] References Cited

U.S. PATENT DOCUMENTS

| 1,926,350 | 9/1933 | Olson | 414/466 |
|---|---|---|---|
| 2,698,118 | 12/1954 | Dickason | 224/42.21 |
| 3,233,853 | 2/1966 | Majewski | 248/231.1 |
| 3,845,891 | 11/1974 | Becher | 224/42.21 |
| 4,050,616 | 9/1977 | Mosow | 224/42.03 B |
| 4,718,582 | 1/1988 | Iovenitts | 224/42.21 |
| 4,817,834 | 4/1989 | Weiler | 224/42.06 |

Primary Examiner—Linda J. Sholl
Attorney, Agent, or Firm—James E. Brunton

[57] ABSTRACT

A bicycle carrier adapted to be interconnected with a camper unit of the character that is typically mounted on the bed of a pickup truck. The bicycle carrier of the invention is uniquely designed to be pivotally mounted on one rear corner of the camper unit and to automatically swing away from the back the camper when the camper door is opened.

4 Claims, 4 Drawing Sheets

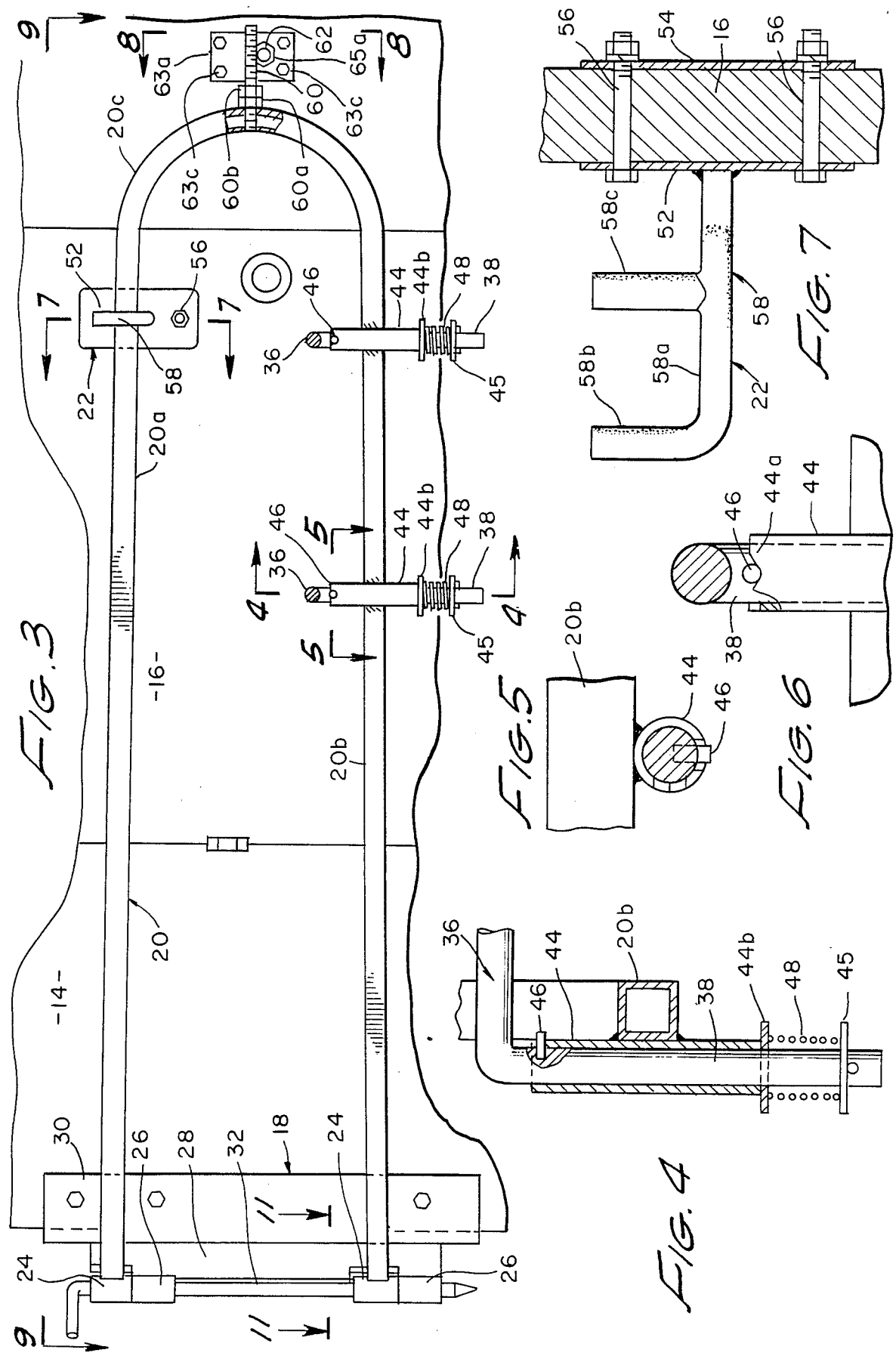

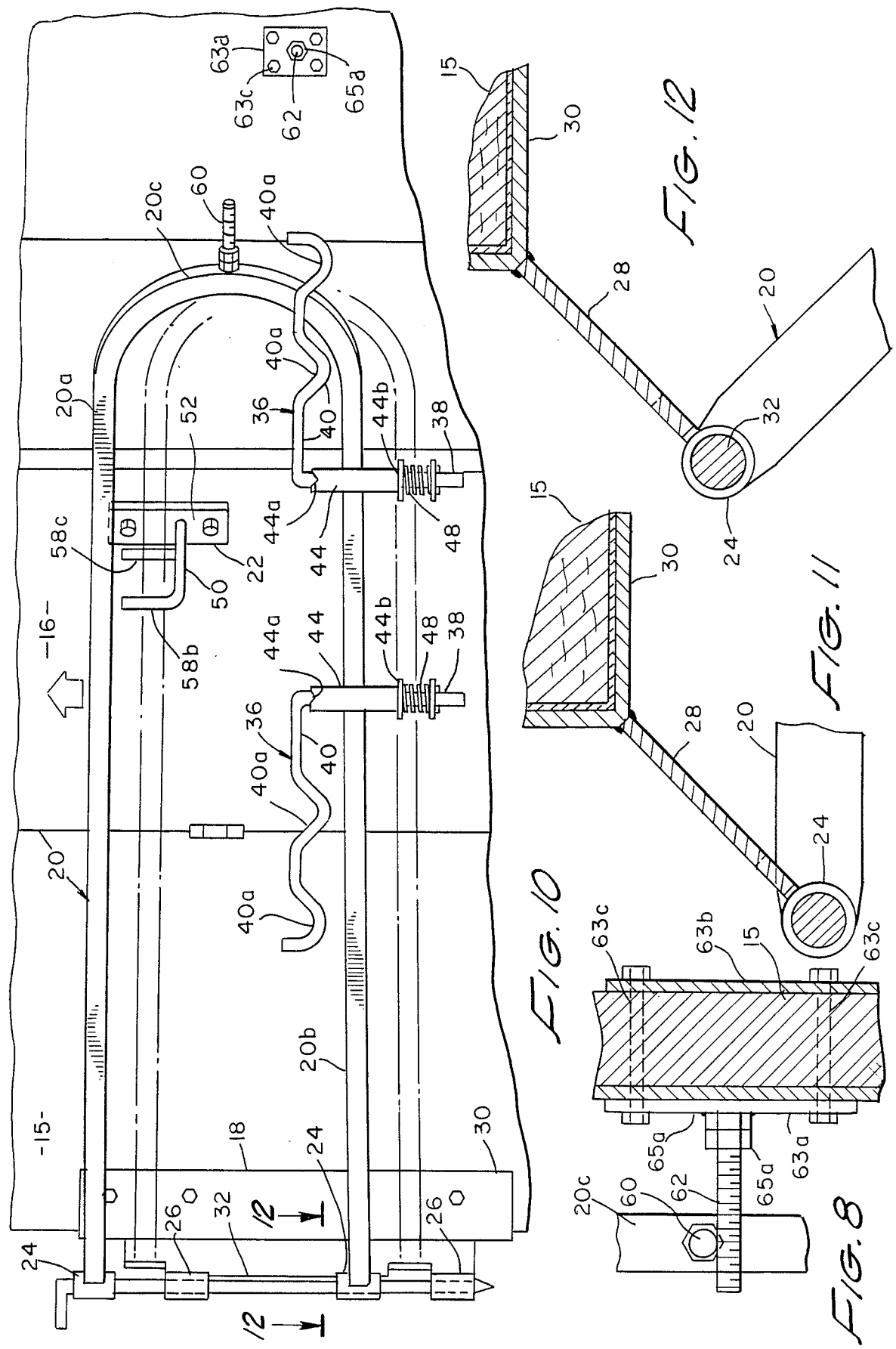

BICYCLE CARRIER

BACKGROUND OF THE INVENTION

1. Field of The Invention

The present invention relates generally to article carriers adapted to be interconnected to vehicles for carrying articles such as bicycles. More particularly, the invention concerns a bicycle carrier which is adapted to be interconnected with a camper unit of the character that is typically mounted on the bed of a pickup truck. The bicycle carrier of the invention is uniquely designed to be pivotally mounted on one rear corner of the camper unit and to automatically swing away from the back of the camper when the camper door is opened.

2. Discussion of The Prior Art

In the past, various devices have been suggested for carrying articles such as bicycles at either the front or the rear of passenger vehicles. Generally these prior art devices are detachably connected to the front or rear bumper of the vehicle by some type of clamping subassembly. Such devices are often cumbersome and inconvenient to use and, when mounted on the front of the vehicle, tend to obscure the vision of the driver. Those types of carriers which mount on the rear of the vehicle are totally unsuitable for use with pickup mounted camper units because they block the rear door to the camper and prevent ingress or egress to the camper unit. The apparatus of the present invention is specifically designed for safe use with pickup mounted camper units.

SUMMARY OF THE INVENTION

It is an object of the present invention to provide a bicycle carrier assembly, or rack, which can be easily attached to the back of a camper unit of the type that is typically mounted on the bed of pickup trucks.

It is another object of the invention to provide a bicycle carrier of the aforementioned character which can be pivotally mounted on the back of the camper unit. and is cooperatively associated with the camper door so that it will automatically swing away from the back of the camper unit whenever the camper door is opened.

Another object of the invention is to provide a bicycle carrier of the character described which is lightweight, easy to use, and does not interfere with the normal operation of the camper unit.

Still another object of the invention is to provide a bicycle carrier of the class described which is of a simple construction and can be easily and quickly removably attached to the rear of the camper unit.

Another object of the invention is to provide a bicycle carrier as described in the preceding paragraphs, in which the various bicycle supporting components of the device can be folded into a coplanar relationship when the frame of the device is not being used to carry a bicycle.

Yet another object of the invention is to provide an bicycle carrier of the character described, which is constructed of a minimum number of component parts, is extremely durable, is easy to use and is attractive and streamlined in appearance.

The foregoing, along with other objects of the invention are achieved by a bicycle carrier adapted to be detachably interconnected with a camper unit of the type that is mounted on a pickup truck. In one form of the invention, the bicycle carrier comprises a mounting bracket connectable to a rear corner of the camper unit; a bicycle supporting frame pivotally connected to the bracket; and a connector member mounted on the access door of the camper unit in such a manner as to safely swing the bicycle carrier away from the back of the camper unit when the door is opened.

BRIEF DESCRIPTION OF THE DRAWINGS

FIG. 3 is a rear elevational view of the bicycle rack of the invention showing the various component parts thereof in greater detail.

FIG. 4 is an enlarged cross sectional view taken along lines 4—4 of FIG. 5 illustrating the pivotal interconnection of the bicycle supporting arms with the main frame of the apparatus.

FIG. 5 is an enlarged cross sectional view taken along lines 5—5 of FIG. 3.

FIG. 6 is an enlarged view, partly in cross section, illustrating the locking mechanism used to maintain the bicycle support arms in the desired orientation.

FIG. 7 is a greatly enlarged cross sectional view taken along lines 7—7 of FIG. 3, illustrating the configuration of the connecting element that interconnects the door of the camper unit with the main frame of the apparatus of the invention.

FIG. 8 is an enlarged cross sectional view taken along lines 8—8 of FIG. 3.

FIG. 10 is a rear elevational view, generally similar to FIG. 3, illustrating the manner in which the main frame of the apparatus is decoupled from the connecting element affixed to the door of the camper unit.

FIG. 11 is a greatly enlarged cross sectional view illustrating the manner in which the main frame of the apparatus is pivotally interconnected with the corner bracket affixed to the corner of the camper unit.

FIG. 12 is a view similar to FIG. 11, but illustrating the pivotal movement of the main frame of the apparatus with respect to the rear face of the camper unit.

DESCRIPTION OF THE INVENTION

Figure 1:
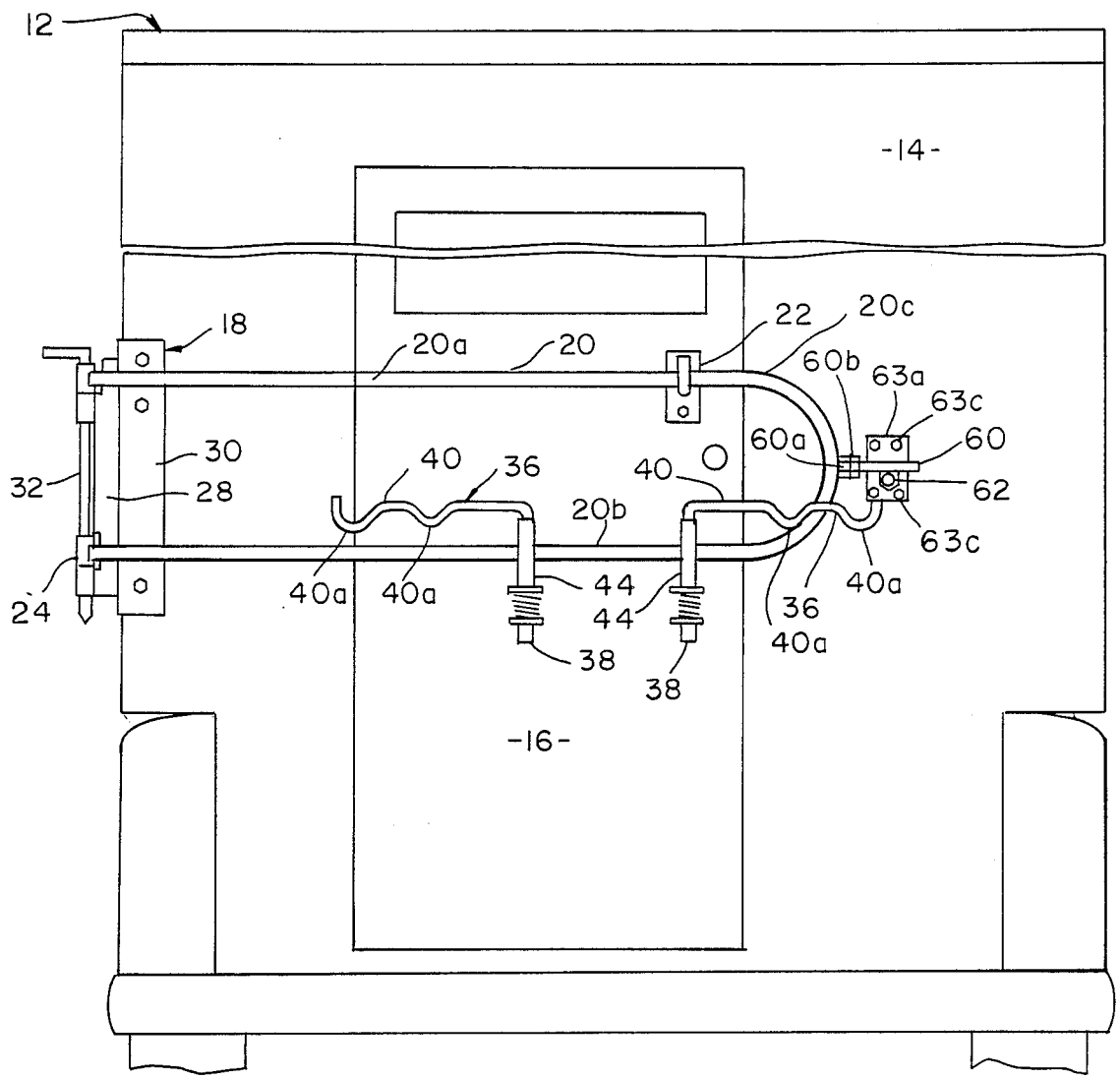
FIG. 1 is a rear elevational view of a camper unit with the bicycle rack of the present invention attached to the camper unit.
Figure 2:
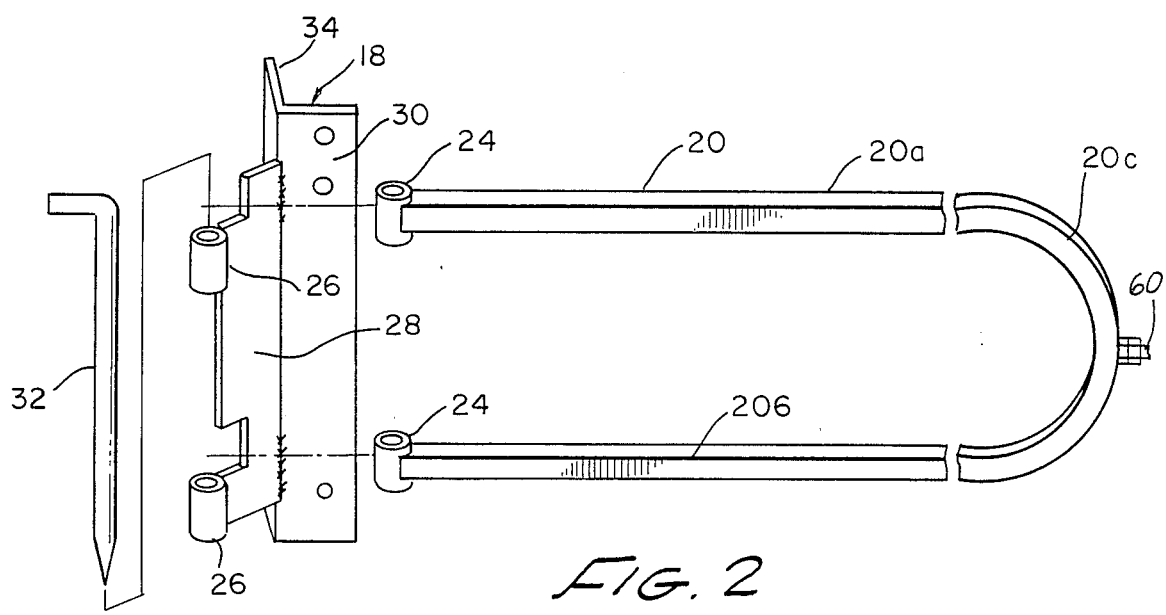
FIG. 2 is a greatly enlarged, generally perspective, foreshortened view of the bicycle rack and the corner mounting bracket which is affixed to the camper unit.

Referring to the drawings, and particularly to FIGS. 1 through 3, the bicycle carrier apparatus of the present invention is adapted for use in connection with camper units of various design as, for example, a camper unit 12 of a character which is mounted on the bed of a pickup truck 14. The camper unit typically includes a rear wall 15 having an outwardly swinging access door 16. In the embodiment of the invention shown in the drawings, the bicycle carrier comprises a mounting assembly 18 which can be connected to the camper unit proximate a rear corner thereof; a bicycle supporting frame 20 which is pivotally connected to the mounting bracket 18, and connector means 22 mounted on the access door 16 of the camper unit for operable association with the bicycle supporting frame 20 to cause the supporting frame to safely move away from the rear wall of the camper unit when door 16 is opened.

Figure 9:
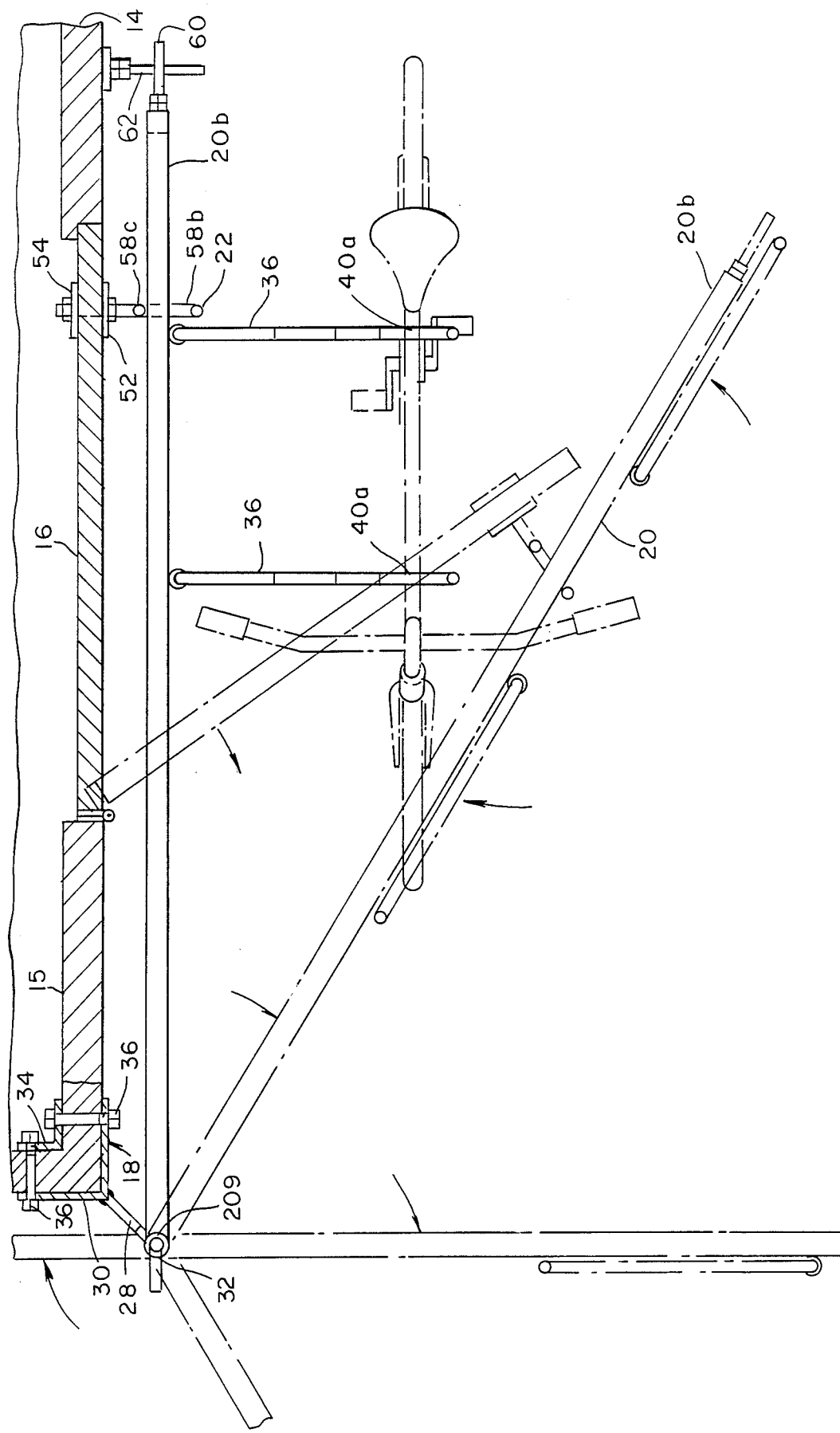
FIG. 9 is a view taken along lines 9—9 of FIG. 3, illustrating, in phantom, the pivotal movement of the apparatus of the invention in conjunction with the opening of the door of the camper unit.

As best seen by also referring to FIG. 9, the bicycle supporting frame 20 is connected proximate a first end thereof to mounting assembly 18 for pivotal movement relative to the corner of the camper unit. As shown in FIG. 9, frame 20 is movable from a first position wherein the second, or opposite end, of the bicycle supporting frame is disposed proximate the rear wall 15 of the camper unit, to a second position, as shown in the phantom lines in FIG. 9, wherein the second end of the bicycle supporting frame is spaced apart from the rear wall of the camper unit. This highly novel safety feature of the apparatus will be discussed in greater detail hereinafter.

As indicated in FIG. 3, the bicycle supporting frame 20 is preferably formed from a single length of square tubing bent into a generally hairpin shaped configuration. Frame 20 includes an upper frame member or portion 20a, a lower frame member or portion 20b and a curved bight portion 20c. Provided at the open, or first, end of the bicycle supporting frame is a pair of vertically spaced, short tubular members 24 (FIG. 2). Tubular members 24 are movable into axial alignment with a second pair of short tubular members 26 mounted on an angularly outwardly extending plate 28 which, in turn, is connected to a length of angle bracket 30. Members 26, 28 and 30 comprise parts of the mounting assembly 18. When tubular members 24 are moved into axial alignment with tubular members 26, an elongated pivot pin 32 can be passed through tubular members 24 and 26 in the manner shown in FIG. 3. With this arrangement frame 20 can move pivotally about the vertical axis of pin 30 in the manner illustrated by the phantom lines in FIG. 9.

As best seen in FIG. 2, the mounting bracket assembly 18 also comprises an inner angle member 34 which, as shown in FIG. 9, is mounted interiorly of the rear wall 15 of the camper unit 12. Angle members 30 and 34 are drilled to receive connectors such as bolts 36 which function to rigidly connect the mounting bracket assembly 18 to the corner of the camper unit 12. With this arrangement, the mounting bracket assembly can be securely affixed to the camper unit so as to support the weight of the bicycle supporting frame as well as the weight of one or more bicycles positioned on the carrier.

Pivotally connected to lower frame member 20b of supporting frame 20 are horizontally spaced apart bicycle supports 36. Supports 36, which are adapted to carry one or more bicycles, are pivotally movable from the folded storage position shown in FIG. 1 into the outwardly extending position shown in FIG. 9. Each support member 36 is provided with a generally vertically extending leg 38 and a generally horizontally extending leg 40. Leg 40 is provided with two depressions 40a which are adapted to receive and support the bicycle frame in the manner shown in FIG. 9.

Turning to FIGS. 4 and 5, the vertical leg 38 of each bicycle support 36 is closely receivable within a tubular member 44, which is affixed as by welding to lower frame member 20b. As more clearly illustrated in FIG. 6, each of the tubular members 44 is provided with a notch 44a adapted to receive a pin 46 which extends outwardly from leg 38 of each support member 36. Turning once again to FIG. 4, it can be seen that a flange 44b is provided at the lower portion of each tubular member 44. Disposed intermediate flange 44a and a washer 45 carried by downwardly extending leg 38 of support member 36 is a coil spring 48. Coil spring 48 yieldably resists upward movement of the bicycle support as the bicycle support is moved into its outwardly extending position as shown in FIG. 3. When supports 36 are in the outwardly extending position, spring 48 tends to maintain each pin 46 within the notches 44a provided in sleeves 44. When the apparatus of the invention is not being used to support one or more bicycles, the bicycle supports can be lifted slightly against the biasing of spring 48 and rotated relative to tubular members 44 into the stowed position shown in FIG. 1.

Forming an important aspect of the apparatus of the present invention is the connector means which is mounted on access door 16 of the camper unit 12. As previously mentioned, the connector means cooperates with the bicycle supporting frame to cause the latter to move from a first position proximate the rear wall of the camper unit to a second position spaced apart from the rear wall. In the embodiment of the invention shown in the drawings, this connector means is provided in the form of an assembly generally designated in FIG. 7 by the numeral 50. Assembly 50 comprises front and rear mounting plates 52 and 54 which engage the inner and outer faces of the camper unit door 16 and are secured in place by means of connectors, such as bolts 56 which pass through the door. Connected to plate 52 by welding, or other suitable means, is an outwardly extending first member 58. Member 58 includes a horizontal leg 58a and two spaced apart upstanding legs 58b and 58c. Upstanding legs 58b and 58c are spaced a sufficient distance to receive therebetween upper frame member 20a in the manner illustrated in FIGS. 3 and 9. With this unique arrangement, when door 16 of the camper unit is swung into the open position as shown by the phantom lines in FIG. 9, the connector means will act upon the bicycle supporting frame to cause it to pivot simultaneously into the position shown in the phantom lines in FIG. 9. This aspect of the invention constitutes an important safety feature which permits an individual within the camper to freely exit the camper unit without interference from the bicycle carrier.

Provided at the bight portion 20c of the bicycle supporting frame is a horizontally extending first threaded member 60. Threaded member 60 is threadably receivable within a nut 60a welded to bight portion 20c and is maintained in a desired position by a lock nut 60b. Threaded member 60 cooperates with a second threaded member 62 which is connected to a front plate 63a located on the rear face of the camper unit 14. Plate 63a (FIG. 8) is connected to a plate 63b located on the inside face of the rear wall 15 by suitable connectors such as bolts 63c. Member 62 is threadably receivable within a nut 65a welded to front plate 63a and is maintained in position by a lock nut 65b. As best seen by referring to FIG. 8, first threaded member 60 rests on threaded member 62 when the bicycle carrier is in its first position. Member 62 along with member 60 functions to support the outboard end of the bicycle carrier in a manner to prevent undue stresses being placed upon the mounting bracket assembly about which the bicycle supporting frame pivots. When the bicycle supporting frame is moved into its second position, threaded member 60 simply slides along threaded member 62 and in no way interferes with the free pivotal movement of the supporting frame.

Referring to FIGS. 10, 11 and 12, the bicycle supporting frame can be decoupled from the connector means in the manner illustrated in these figures. More particularly, when it is desired to free frame 20 from the connector means, frame 20 is swung pivotally outwardly from the position shown in FIG. 11 to the position shown in FIG. 12. In this position, the bicycle supporting frame can be lifted so as to clear the upstanding legs 58*b* and 58*c* of arm 58 of the connector means. Once the supporting frame is clear of these legs, the supporting frame can be freely pivoted about pivot pin 32 throughout an angle of as much as 270 degrees to a location proximate the side wall of the camper thereby freeing the camper for normal use.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A bicycle carrier for use in connection with a camper unit of the character mounted on a pickup truck and having a rear wall and an outwardly swinging access door provided in said rear wall, said bicycle carrier comprising:
   (a) a mounting bracket assembly connectable proximate a rear corner of the camper;
   (b) a bicycle supporting assembly for supporting at least one bicycle including:
      (i) a frame having first and second ends, said frame being connected at said first end to said bracket assembly for pivotal movement from a first position, wherein said second end of said frame is disposed proximate the rear wall of the camper unit, to a second position wherein said second end of said frame is spaced apart from the rear wall of the camper unit, said frame further including a pair of vertically spaced apart upper and lower frame members interconnected by a curved portion comprising said second end of said frame; and
      (ii) outwardly extending bicycle supports pivotally connected to said upper frame member, said bicycle supports being movable from an outwardly extended position into a folded position wherein said bicycle supports are substantially coplanar with the plane of said upper and lower frame members;
   (c) connector means mounted on the access door of the camper unit for operable association with said frame to cause said bicycle supporting frame to move from said first position to said second position when said access door is opened, sad connector means comprising a first member extending outwardly from said access door and a pair of spaced apart upstanding legs connected to said first member, said upper frame member being receivable between said upstanding legs.

2. A bicycle carrier as defined in claim 1 in which said mounting bracket assembly comprises:
   (a) a first angle member adapted to be disposed interiorly of the camper unit;
   (b) a second angle member adapted to be disposed exteriorly of the camper unit;
   (c) means for connecting said first and second angle brackets to the camper unit;
   (d) pivot means connected to said second angle member for interconnection with said frame for permitting pivotal movement of said frame relative to said second angle member.

3. A bicycle carrier as defined in claim 1 in which said frame is pivotal through an angle of about 270 degrees.

4. A bicycle carrier for use in connection with a camper unit of the character mounted on a pickup truck and having a rear wall and an outwardly swinging access door provided in said rear wall, said bicycle carrier comprising:
   (a) a mounting bracket assembly connectable proximate a rear corner of the camper;
   (b) a bicycle supporting assembly for supporting at least one bicycle including a frame comprising a pair of vertically spaced apart upper and lower frame members interconnected by a curved portion, said frame having first and second ends, said second end comprising said curved portion, said frame being connected to said bracket assembly for pivotal movement from a first position, wherein said second end of said frame is disposed proximate the rear wall of the camper unit, to a second position wherein said second end of said frame is spaced apart from the rear wall of the camper unit; and
   (c) connector means mounted on the access door of the camper unit for operable association with said frame to cause said bicycle supporting frame to move from said first position to said second position when said access door is opened, said connector means comprising a first member extending outwardly from said access door and a pair of spaced apart upstanding legs connected to said first member, said upper frame being receivable between said upstanding legs.

* * * * *